(No Model.)

J. J. HARDEN.
ANTI FRICTION GLASS BEARING.

No. 300,467. Patented June 17, 1884.

Attest:
Henry F. Grier.
Bernard T. Voute.

Inventor:
John J. Harden
per Robert Burns
Attorney.

UNITED STATES PATENT OFFICE.

JOHN J. HARDEN, OF CHICAGO, ILLINOIS, ASSIGNOR TO THE HARDEN CRYSTAL BEARING COMPANY, OF SAME PLACE.

ANTI-FRICTION GLASS BEARING.

SPECIFICATION forming part of Letters Patent No. 300,467, dated June 17, 1884.

Application filed January 10, 1884. (No model.)

*To all whom it may concern:*

Be it known that I, JOHN J. HARDEN, a citizen of the United States, and a resident of Chicago, in the county of Cook and State of Illinois, have invented certain new and useful Improvements in Anti-Friction Glass Bearings, of which the following is a specification.

My invention relates to that class of journals or surface-bearings for machinery in which glass is employed in whole or part to form the bearing-surface; and my improvement has for its object to prevent the adhesion or sticking together of the bearing parts caused by the glazing of the metal in use and the working out and exclusion of the lubricant and air from the point of contact. I attain such object by the construction of parts illustrated in the accompanying drawings, in which—

Figure 1:
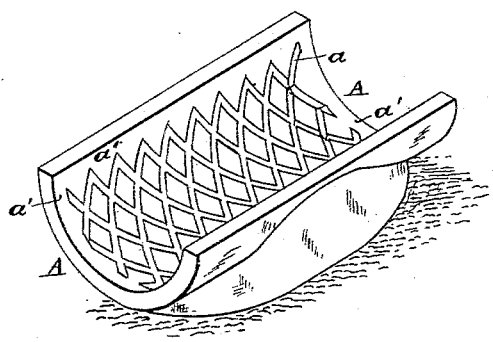
Figure 2:
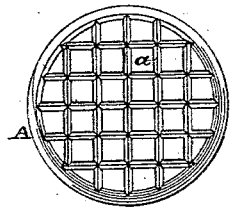

Figure 1 is a perspective view illustrating my improvement adapted to an ordinary journal box or bearing, and Fig. 2 a plan view showing my improvement adapted to one of the plugs or blocks which are employed in surface-bearings.

Glass journals or bearings as heretofore used have been formed with a continuous and even bearing-surface, and with such construction I find, from practical experience, that after use for some time the metal portion of the journal or bearing becomes glazed, so that the lubricant and air will be worked out and excluded from between the bearing-surfaces, causing the same to adhere very strongly together.

To remedy such defect is the object of the present invention, which, to this end, consists in forming in the glass bearing-surface A, grooves or corrugations $a$ to receive the lubricant and also divide up the bearing-surface so that there will be no single extended bearing-surface for adhesion to take place on. The grooves $a$ may be of any suitable shape, and are preferably arranged in spiral directions, crossing each other, so as to form a series of diamond-shaped bearing-surfaces, as indicated in Fig. 1. Still I do not limit myself to such spiral arrangement of the grooves, as they can be arranged in parallel directions or in any other suitable manner, as found most desirable or convenient, without departing from the spirit of my invention.

In the larger blocks or bearings of glass it is preferred to leave a marginal rim, $a'$, around the edges of the bearing, as indicated in Fig. 1, to retain the lubricant in place.

I am aware that prior to my invention bearings have been formed of glass, and also that metal bearings have been formed with corrugations for conducting oil more evenly and thoroughly to the bearing-surface. I therefore do not claim such constructions broadly; but What I do claim, and desire to secure by Letters Patent, is—

1. As an improved article of manufacture, an anti-friction glass bearing having its bearing-surface grooved or corrugated, essentially as set forth.

2. A bearing or journal, A, formed of glass and provided with grooves $a$ in its bearing-surface, essentially as set forth.

3. A bearing or journal, A, formed of glass and provided with spiral grooves $a$ in its bearing-surface, essentially as set forth.

4. A bearing or journal, A, formed of glass and having its bearing-surface provided with spiral grooves $a$, arranged in reverse directions, so as to cross each other, essentially as set forth.

5. A bearing or journal, A, formed of glass and having a plain marginal rim around the edges of its grooved bearing-surface, essentially as set forth.

6. A bearing or journal, A, formed of glass and provided with a plain marginal rim, $a'$, and a spirally grooved or corrugated bearing-surface, such grooves being arranged in opposite directions, essentially as set forth.

JOHN J. HARDEN.

Witnesses:
ROBERT BURNS,
BERNARD T. VOÜTE.